United States Patent [19]
Schukei et al.

[11] Patent Number: 5,122,331
[45] Date of Patent: Jun. 16, 1992

[54] PELLET STACKING MACHINE

[75] Inventors: Glen E. Schukei, South Windsor; Paul W. Hubert, Simsbury; Gilles J. Page, Enfield; Robert W. Franzen, West Suffield, all of Conn.

[73] Assignee: Combustion Engineering, Inc., Windsor, Conn.

[21] Appl. No.: 699,120

[22] Filed: May 13, 1991

[51] Int. Cl.⁵ .............................................. G21C 21/00
[52] U.S. Cl. ..................................... 376/261; 209/542
[58] Field of Search ................. 376/261, 245, 258; 209/542, 539, 540, 538, 920; 29/723, 906

[56] References Cited

U.S. PATENT DOCUMENTS

| | | | |
|---|---|---|---|
| 2,186,652 | 1/1940 | Orth et al. | 209/542 |
| 4,385,700 | 5/1983 | Hodges et al. | 209/539 |
| 4,549,662 | 10/1985 | Schoenig, Jr. et al. | 209/539 |
| 4,804,093 | 2/1989 | Durow | 209/691 |
| 4,849,156 | 7/1989 | Durow et al. | 376/261 |
| 4,895,694 | 1/1990 | Yokoyama | 376/261 |
| 4,933,074 | 6/1990 | Fuller, Jr. et al. | 209/542 |
| 5,022,142 | 6/1991 | Widener | 29/723 |

Primary Examiner—Daniel D. Wasil
Attorney, Agent, or Firm—Paul J. Lerner

[57] ABSTRACT

A device for aligning nuclear fuel pellets, for insertion into fuel rods, comprises a vibrating table and a conveyor assembly adapted to receive pellets poured from a container and to deposit them in a single layer on the table. The upper surface of the table is formed with a number of parallel, substantially v-shaped grooves in which the pellets become aligned. The conveyor assembly, which comprises a horizontal traveling belt and an inclined planar slide, is slid along above the table to facilitate the distribution of pellets thereon. An inspection station, adjacent the table, comprises a number of rotating, parallel rollers in columnar-flow communication with the table grooves. Aligned pellets from the table are delivered onto the rollers where they slowly rotate, presenting their circumferential surfaces for visual inspection. A displaceable control member, transversely disposed between the table and the inspection station, controls transfer of pellets therebetween. A number of trough members, each adapted to receive a column of aligned pellets, are releasably attachable to the distal end of the inspection station.

13 Claims, 6 Drawing Sheets

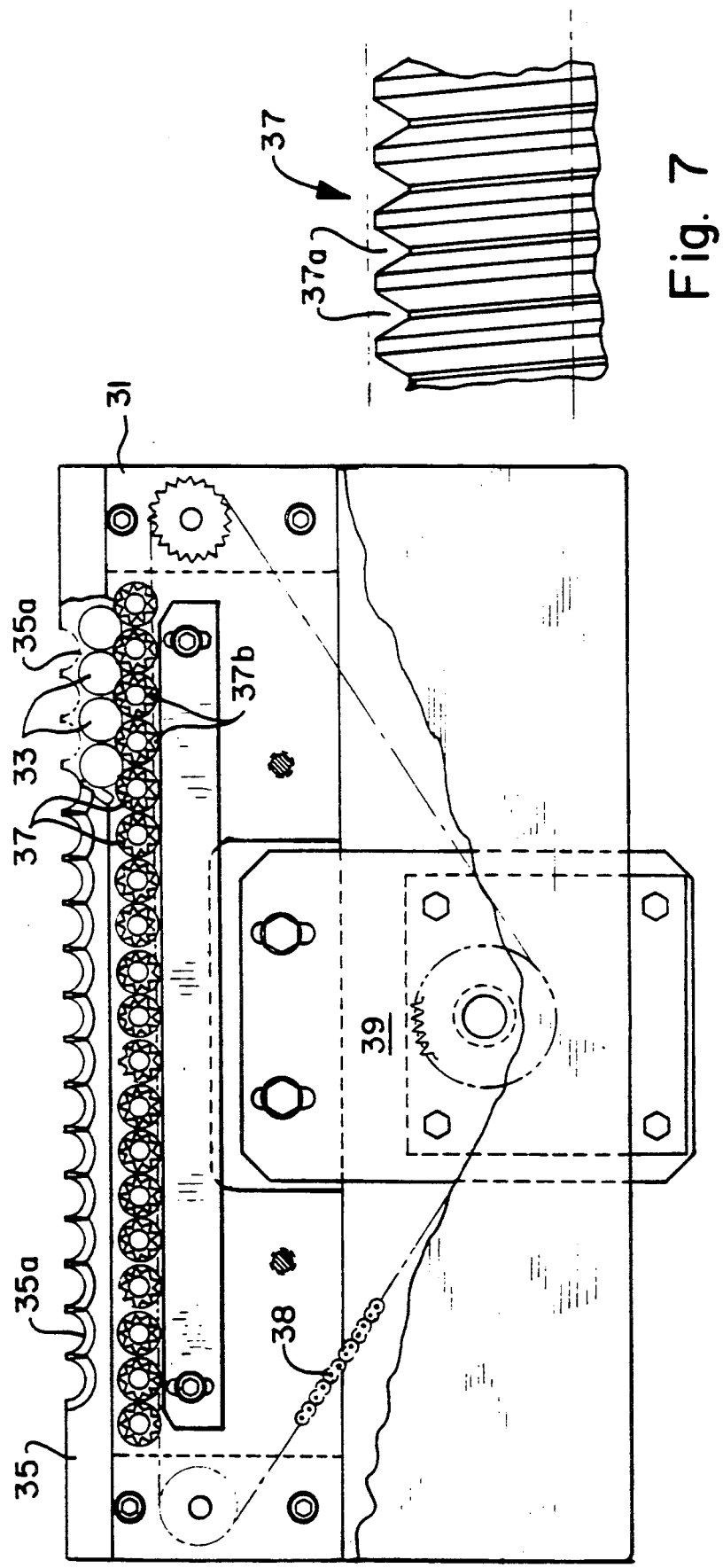

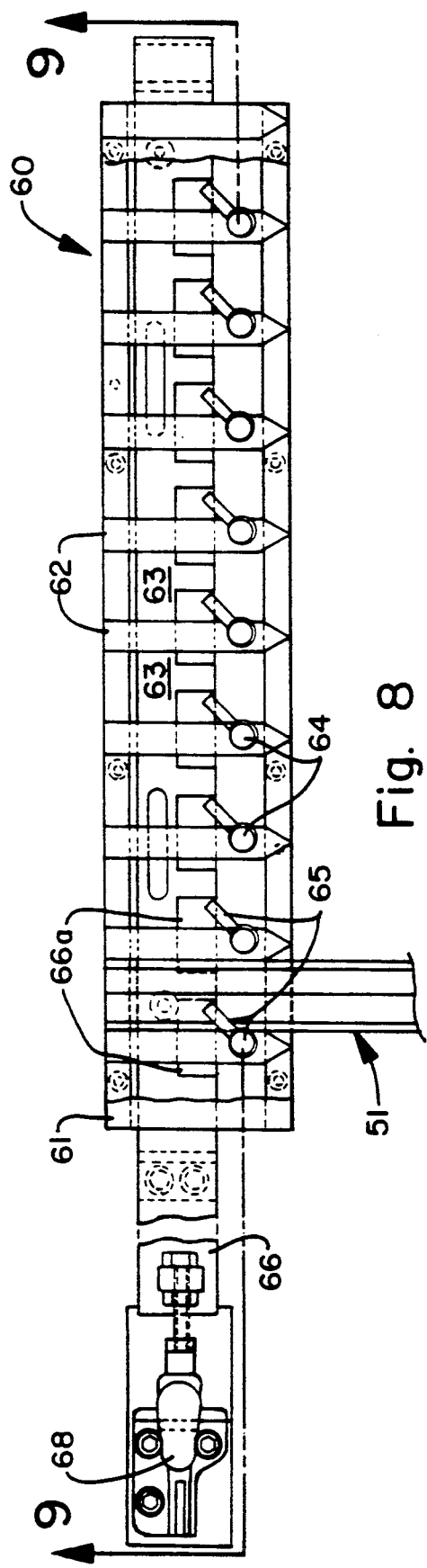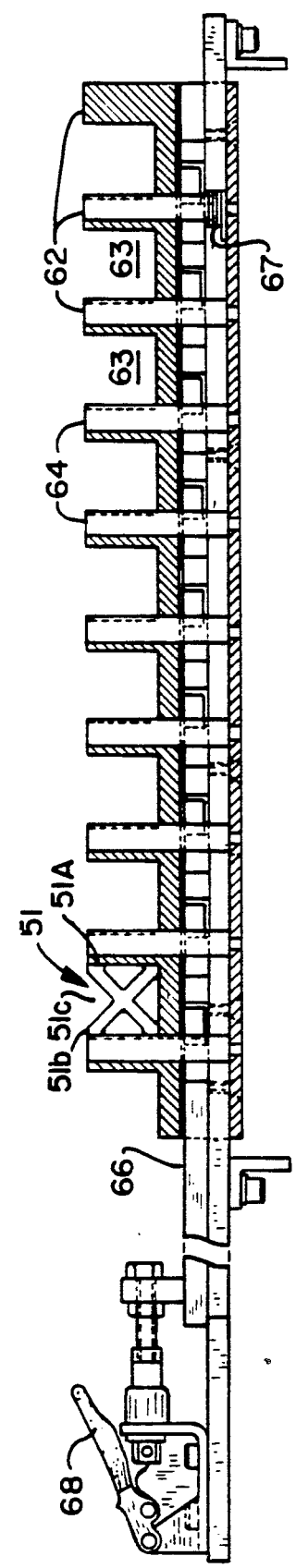

PELLET STACKING MACHINE

BACKGROUND AND SUMMARY OF THE INVENTION

The present invention pertains to nuclear fuel rods for use in nuclear reactors and, more particularly, to a device for aligning nuclear fuel pellets so as to facilitate subsequent filling of fuel rods with the pellets.

In a typical nuclear reactor, the reactor core includes a large number of fuel assemblies, each of which is composed of a multiplicity of elongated fuel elements or rods. The fuel rods each contain fissile material in the form of a plurality of generally cylindrical nuclear fuel pellets stacked within a hollow tube. The pellets, which are formed of a sintered metal oxide, are rather fragile and are subject to cracking and chipping. Use of cracked or chipped pellets may result in localized operating abnormalities within the reactor core and, therefore, must be avoided. For this reason, the pellets must be carefully inspected before being loaded or inserted into the tubes to form fuel rods. The inspection process is complicated by the fact that the pellets are, of course, radioactive. This requires that the duration of human exposure to the pellets be minimized. A further problem is presented by any chips or fragments which may separate from the pellets during inspection and preparation for loading. All such chips and fragments must be captured for appropriate disposal or they will constitute a serious impediment to entry of the pellets into the tube.

It is, therefore, a primary object of the present invention to provide a device for axially aligning nuclear fuel pellets while avoiding or minimizing damage thereto.

It is a further object to provide such an alignment device which advantageously includes means for separating and collecting any chips or other fragments which may become detached from the bodies of the pellets.

It is yet another object to provide such an alignment device which advantageously includes means for rotating the aligned pellets, to facilitate visual inspection of their circumferential surfaces, without disturbing their axial alignment.

The foregoing and other objects as may hereinafter appear are achieved by an aligning device comprising a grooved, vibrating table and a conveyor assembly for receiving fuel pellets and depositing them on the table. More specifically, the table surface is formed with a plurality of parallel grooves each comprising a pair of inclined, planar side surfaces and a curved bottom surface. The conveyor assembly includes a horizontal traveling belt, onto which the pellets are poured from a container, and an inclined planar slide communicating between the belt and the grooved surface of the table. The conveyor assembly is movably supported for reciprocating motion above the oscillating table to facilitate the deposit of the pellets thereon in a single layer.

Advantageously, the aligning device includes an inspection station comprising a frame, disposed adjacent the vibrating table, which supports a plurality of elongate cylindrical rollers in parallel, spaced relation. The cylindrical rollers loosely rest on a plurality of grooved rollers, rotatably mounted on the frame and rotated in unison by a drive chain and motor. Aligned pellets from the oscillating table are delivered onto the cylindrical rollers where they are caused to slowly rotate about their longitudinal axes, thereby presenting their entire circumferential surfaces for visual inspection.

A control member is transversely disposed between the oscillating table and the inspection station. The control member is displaceable between a first position, whereat a column of aligned pellets may be transferred from the table to the inspection station, and a second position, whereat such transfer is prevented.

A plurality of trough members are provided, each adapted to receive a single column of aligned pellets. A locking member, on the distal end of the inspection station, releasably secures the trough members in columnar-flow communication therewith. The aligned and inspected pellets are transferred to the trough members and, thereafter, the individual trough members are taken to a loading station whereat the pellets are inserted into fuel rods.

BRIEF DESCRIPTION OF THE DRAWINGS

FIG. 6 is an end plan view of the roller table of FIG. 1;

FIG. 7 is an enlarged, fragmentary view of a lower roller;

FIG. 8 is a top plan view, partially broken away, of a trough-attaching assembly in accord with the present invention;

FIG. 9 is a cross-sectional view taken along line 9—9 of FIG. 8;

DESCRIPTION OF THE PREFERRED EMBODIMENT

Figure 1:
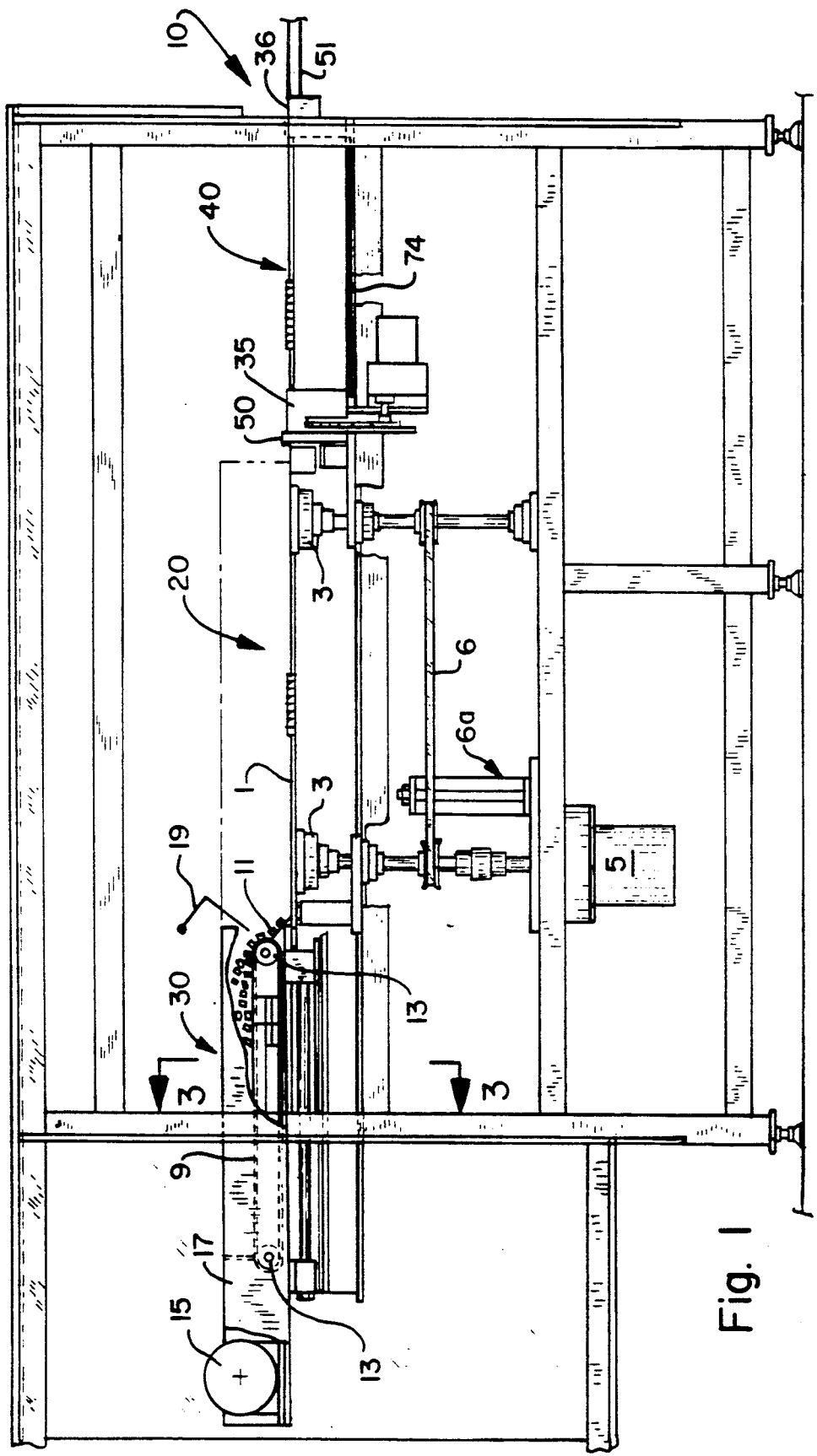
FIG. 1 is a front plan view of a pellet aligning device in accord with the present invention.
Figure 3:
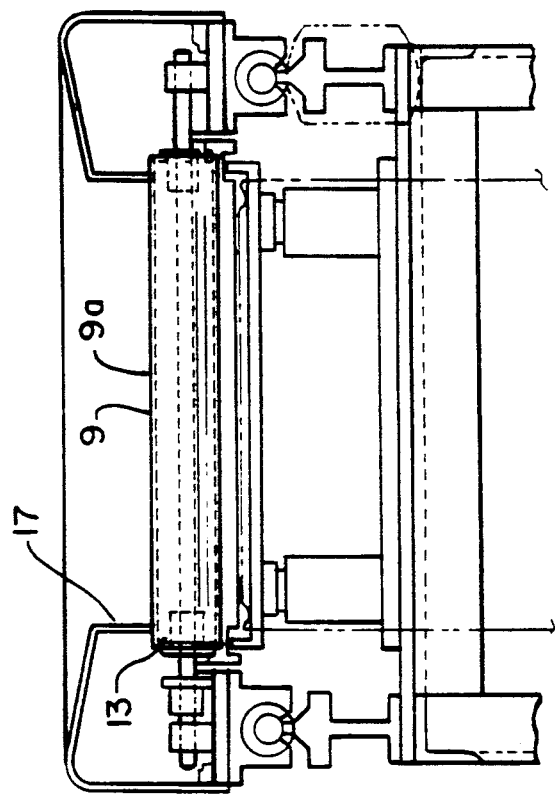
FIG. 3 is a cross-sectional view taken along line 3—3 of FIG. 1.
Figure 2:
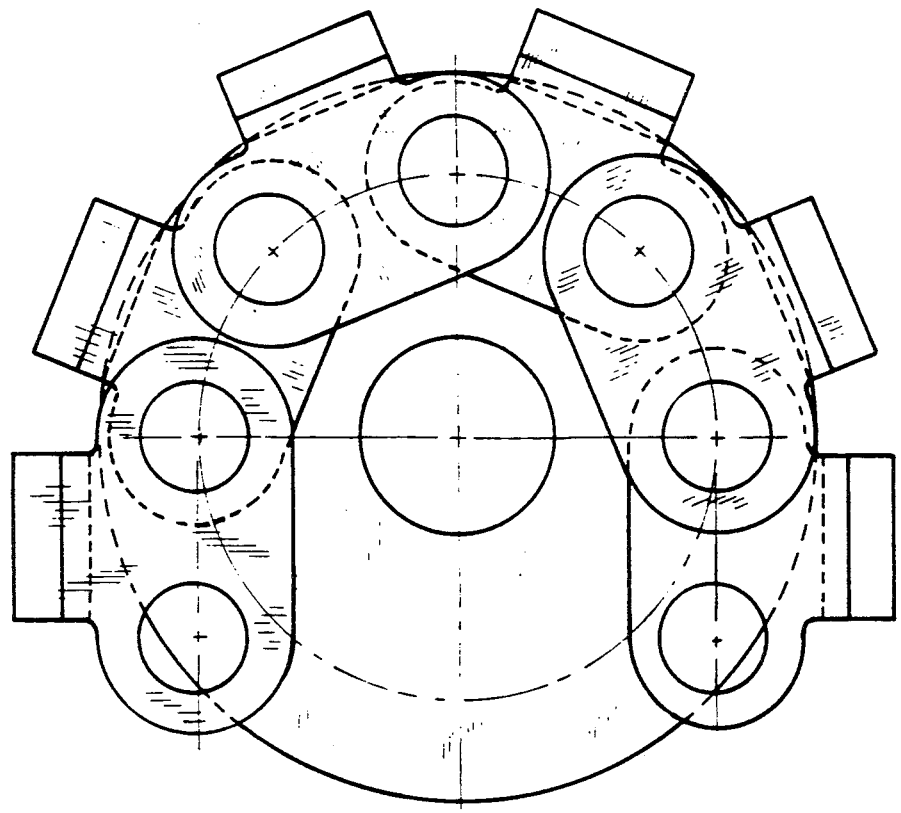
FIG. 2 is a fragmentary side plan view of the conveyor belt of FIG. 1.
Figure 11:
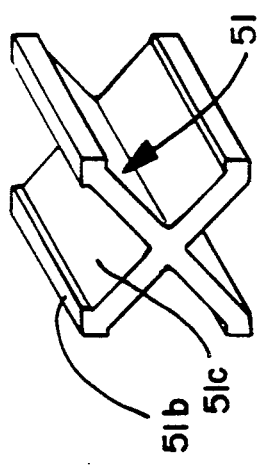
FIG. 11 is a perspective view of a pellet-receiving trough member.

Turning now to the drawings, there is shown in FIG. 1 a pellet aligning device 10 comprising a vibrating table 20 and a conveyor assembly 30 adapted to receive pellets poured from a container and to deposit them in a single layer on the upper surface 1 of table 20.

Figure 4:
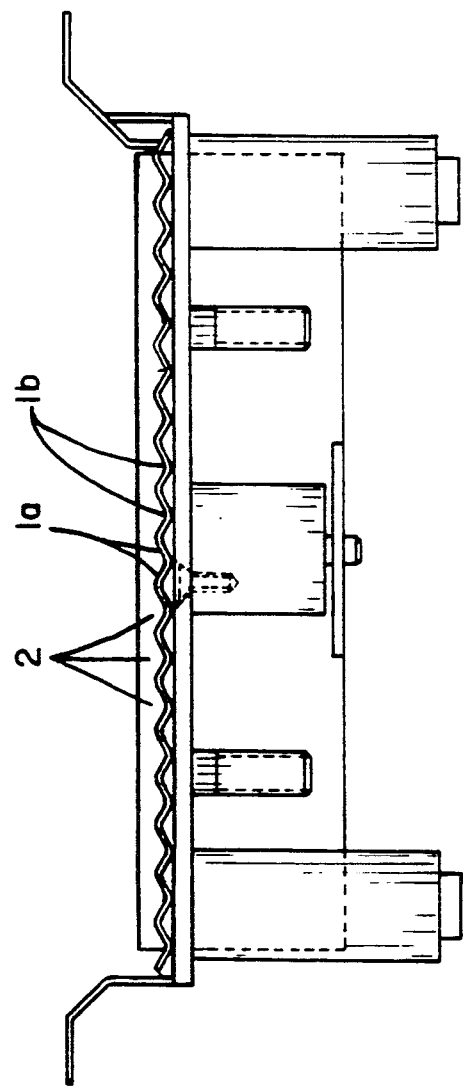
FIG. 4 is a cross-sectional view of the vibrating table of FIG. 1.

As best seen in FIG. 4, table upper surface 1 is formed with a plurality of longitudinally extending grooves 2, each comprising a pair of planar side surfaces 1a and a curved bottom surface 1b. Rotatable cams 3 are attached to the underside of upper surface 1 at either end of table 20. Cams 3 are synchronally driven in known manner by motor 5 to vibrate table upper surface 1. As illustrated, one of cams 3 may be directly coupled to motor 5, while the other is driven through a belt 6 maintained at a desired tension by an idler pulley 6a. Oscillation of table upper surface 1 causes any pellets thereon to align themselves in grooves 2. Through experimentation, it has been determined that such alignment is optimally achieved when the included angle A between the groove side surfaces 1a is about 120° and the table is oscillated in a circular motion.

Conveyor assembly 30 includes a horizontally traveling endless belt 9 and an inclined planar slide 11 communicating between the belt load-carrying surface 9a and table upper surface 1. Slide 11 terminates in a number of teeth 11a which project into grooves 2 so as to be engageable with the end members of columns of pellets aligned therein. Belt 9, onto which pellets are poured, is supported on two pulleys 13 and driven by a motor 15 in conventional manner. Belt 9 comprises two metal-linked edge members 9b connected by a plurality of transverse metal bars 9c arranged in parallel, spaced relation. An upstanding metal retaining member 17 surrounds belt load-carrying surface 9a on three sides, allowing pellet egress only by way of slide 11, which is also flanked by retaining member 17. A transverse member 19 is pivotally superposed above slide 11 and controlled by an air cylinder (not shown) which is adapted to displace member 19 to a position blocking slide 11, one or two seconds after belt 9 has stopped. Conveyor assembly 30 is slidably superposed above table 20 for reciprocation between the ends of grooves 2, for reasons which will be hereinafter fully explained.

Adjacent table 20, there is disposed a pellet inspection station 40 comprising a frame 31 in which are rotatably supported a plurality of elongate cylindrical rollers 33, in parallel, spaced relation between grooved entry and exit connecting members 35 and 36 respectively. Cylindrical rollers 33 loosely rest atop and between a plurality of grooved roller 37, rotatably mounted in frame 31. Roller grooves 37a may be annular but are preferably helical for ease of fabrication. At an end of each of grooved rollers 37 is a toothed gear 37a, allowing rollers 37 to be rotated in unison by a chain 38 and motor 39. It will be appreciated that rotation of grooved rollers 37 results in rotation of cylindrical rollers 33, which are in columnar-flow communication with table upper surface 1 and connecting members 35 and 36, i.e., a column of aligned pellets in one of grooves 2 may be slid therealong and thence onto entry connecting member 35, passing along a corresponding groove 35a therein, thereafter continuing along the space between two adjacent ones 35a of cylindrical rollers 33, and finally traversing a corresponding groove 36a in exit connecting member 36. It will be further appreciated that pellets disposed on rotating cylindrical rollers 33 rotate about their longitudinal axes, thereby presenting their entire circumferential surfaces for visual inspection.

Between table 20 and inspection station 40, is disposed a transverse thin planar control member 50 which is displaceable, by conventional mechanical means, between a first or projecting position, whereat columnar flow as above-described is obstructed, and a second or retracted position, whereat columnar flow is unobstructed.

A plurality of trough members 51 are provided, each comprising an elongate metal bar having parallel, planar sides 51a and an upper surface 51b. A longitudinally extending groove 51c, formed in upper surface 51b, is adapted to receive a column of aligned pellets in such manner that a pair of trough members 51, disposed in facing relation, completely encase and support pellets emplaced therebetween. One or more trough members 51 may be releasably secured to the distal end of inspection station 40, i.e., adjacent exit connecting member 36, by means of a locking device 60 which maintains such trough member or members in columnar-flow communication with inspection station 40.

As best seen in FIGS. 8 and 9, locking device 60 comprises a bar 61 divided by uprights 62 into a number, typically nine, of channels 63 each adapted to receive a single trough member 51. Cams 64, disposed within uprights 62, flank each of channels 63 and are rotatable between a first or extended position, whereat they project into channels 63, and a second or retracted position whereat they are entirely within uprights 62. Cams 64 are biased to the extended position by springs 67. In this position, they clampingly engage the side 51a of a trough member 51 in the corresponding channel 63. Operating arms 65, projecting from cams 64, are captured in cutouts 66a in a connecting arm 66 slidably carried for transverse displacement with respect to bar 61. Connecting arm 66 is operably connected to displaceable handle 68, such that raising handle 68 causes a displacement of connecting arm 66 (leftward as seen in the figures), rotating cams 64 against springs 67 and releasing any trough members 51 in channels 63.

Figure 10:
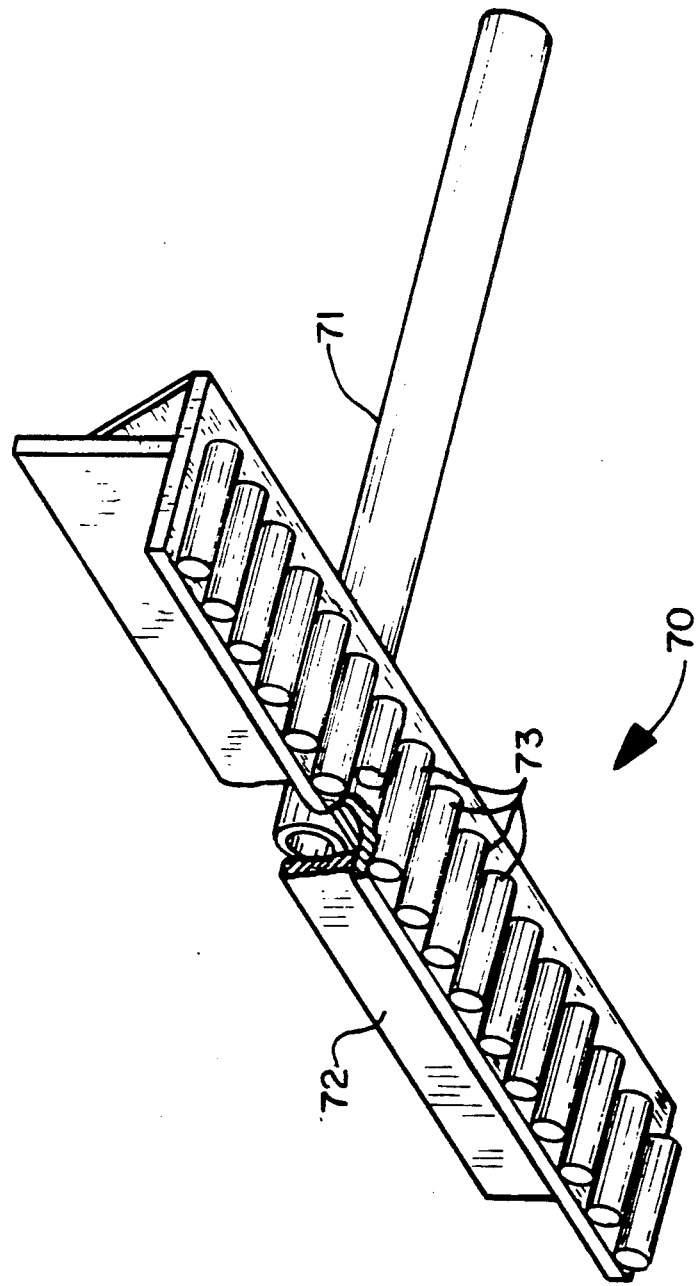
FIG. 10 is a perspective view of a pellet pusher for use with the aligning device of the present invention.

A pellet pusher 70, seen in FIG. 10, comprises a handle 71 attached at a right angle to a cross member 72 bearing a number of parallel, projecting prongs 73 spaced so as to be engageable with the end members of columns of aligned pellets on inspection station 40.

In use, pellets are poured from a suitable container onto belt 9 of conveyor assembly 30. With conveyor assembly 30 disposed adjacent inspection station 40, and with control member 50 in the first or projecting position, motor 15 is activated, thereby setting belt 9 in motion. As the pellets are conveyed to slide 11 and thence slide downwardly onto upper surface 1 of vibrating table 20, conveyor assembly 30 is manually displaced away from inspection station 40 (leftwardly as seen in FIG. 1) whereby a single layer of pellets is deposited onto oscillating table surface 1. After a suitable period of time, the pellets become aligned in grooves 2 under the influence of the table oscillation. Any chips or other fragments which may separate from the pellets while they are on belt 9 pass between bars 9c and are collected in a tray 9d removably carried therebeneath.

When the pellets are loosely aligned in grooves 2, oscillation of table surface 1 is terminated and control member 50 is withdrawn to its second or retracted position. Conveyor assembly 30 is now manually displaced toward inspection station 40 (rightwardly as seen in FIG. 1). As conveyor assembly 30 moves along over table 20, teeth 11a on slide 11 engage the aligned pellets in grooves 2, forming the pellets into columns and pushing the pellet columns onto inspection station 40. During this column formation, transverse member 19 is in its closed position and prevents any pellets on slide 11 from dropping onto table surface 1.

Figure 5:
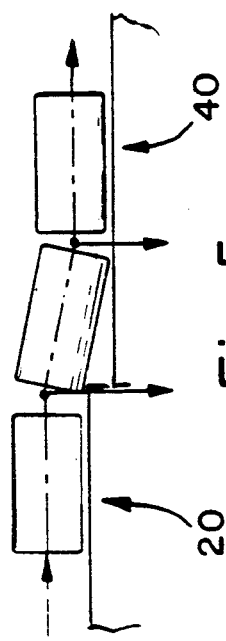
FIG. 5 is an enlarged, simplified view of the juncture between the vibrating table and the roller table of FIG. 1.

The pellet-engaging surfaces of inspection station 40 are lower than the corresponding surfaces of grooves 2 in table surface 1. As illustrated in FIG. 5, this height disparity causes a temporary angularly separation of the end surfaces of adjacent ones of the columnated pellets as they pass from table 20 to inspection station 40. During this separation, any loose chips or fragments fall free, passing between table 20 and inspection station 40, and are collected in a tray 74 removably disposed therebeneath. Through experimentation, it has been determined that an offset or height differential of approximately 1/16 inch is optimal for this purpose.

With the columns of aligned pellets resting on and between cylindrical rollers 33, motor 39 is activated, continuously or intermittently, causing the pellets to slowly rotate about their longitudinal axes as previously described. During this rotation, the entire circumferential surface of the pellets is visually inspected. Any chips or other fragments which separate from the pellets at this point drop between adjacent cylindrical rollers 33 and then pass between cylindrical rollers 33 and supporting grooved rollers 37 by way of roller grooves 37a. Any such chips or fragments are collected in tray 74.

After a quantity of pellets have been aligned and inspected, they are manually pushed, by means of pellet pusher 70, into a number of trough members 51 secured in locking device 60. Filled trough members 51 are released from inspection station 40, as above described, and may be aligned with empty fuel rod tubes for convenient transfer of the pellets into the tube.

We claim:

1. A device for aligning cylindrical nuclear fuel pellets, comprising:
   a table having a plurality of parallel grooves formed in an upper surface thereof, said grooves each comprising a pair of planar side surfaces and a curved bottom surface, the included angle between said planar side surface being approximately 120°;
   a conveyor assembly for receiving fuel pellets and depositing them on said table upper surface; and
   means for oscillating said table upper surface to align fuel pellets on said table upper surface in said grooves.

2. A device for aligning cylindrical nuclear fuel pellets, comprising:
   a table having a plurality of parallel grooves formed in an upper horizontal surface thereof;
   a conveyor assembly for receiving fuel pellets and depositing them on said table upper surface, said conveyor assembly including a horizontally traveling belt, onto which fuel pellets may be poured from a container, and an inclined planar slide communicating between said belt and said table upper surface, said conveyor assembly being movably supported for reciprocating motion with respect to said table; and
   means for oscillating said table upper surface in a circular motion to align fuel pellets on said table upper surface in said grooves.

3. The device of claim 2, wherein said conveyor means further includes a transverse member pivotally disposed above said slide for controlling the flow of pellets on said slide.

4. The device of claim 2, further comprising inspection means for rotating at least one aligned column of pellets about its longitudinal axis without disturbing the axial alignment thereof.

5. The device of claim 4, wherein said inspection means comprises a frame and a plurality of elongate cylindrical rollers rotatably supported in said frame in parallel, spaced relation, said cylindrical rollers being parallel to said grooves in said upper surface of said table and in columnar-flow communication therewith.

6. The device of claim 5, further comprising a control member disposed between said table and said inspection means and displaceable between a first position, whereat movement of a column of aligned pellets from said table to said inspection means is obstructed, and a second position, whereat such movement is unobstructed.

7. The device of claim 4, further comprising a plurality of pellet-receiving trough members and locking means for releasably locking said trough members to said inspection means in columnar-flow communication therewith.

8. The device of claim 4, further comprising displacement means on said conveyor assembly for displacing an aligned column of pellets from said table upper surface to said inspection means.

9. The device of claim 8, wherein said conveyor assembly comprises a horizontally traveling belt and an inclined planar slide communicating between said belt and said table upper surface, said conveyor assembly being movably supported for reciprocating motion with respect to said table, said displacement means comprising an edge portion of said slide adapted to engage end ones of pellet aligned in columns in said grooves.

10. The device of claim 2, wherein said traveling belt comprises a pair of metal link edge members connected by a plurality of transverse metal bars, said bars being disposed in parallel, spaced relation.

11. The device of claim 2, further comprising a tray disposed beneath said traveling belt and adapted to receive chips and fragments separated from pellets deposited on said conveyor assembly.

12. The device of claim 4, further comprising a tray disposed beneath said inspection means and adapted to receive chips and fragments separated from pellets on said inspection means.

13. A device for aligning cylindrical nuclear fuel pellets, comprising:
   a table having a plurality of parallel grooves formed in an upper horizontal surface thereof;
   a conveyor assembly for receiving fuel pellets and depositing them on said table upper surface;
   means for oscillating said table upper surface in a circular motion to align fuel pellets on said table upper surface in said grooves;
   inspection means for rotating at least one aligned column of pellets about its longitudinal axis without disturbing the axial alignment thereof, said inspection means comprising a frame, a plurality of elongate cylindrical rollers rotatably supported in said frame in parallel, spaced relation, said cylindrical rollers being parallel to said grooves in said upper surface of said table and in columnar-flow communication therewith a plurality of grooved elongate rollers rotatably supported in said frame, in spaced, parallel relation, and means rotatably driving said grooved rollers in a common direction, said cylindrical rollers resting on said grooved rollers.

* * * * *